(12) United States Patent
Martin et al.

(10) Patent No.: US 6,546,952 B1
(45) Date of Patent: Apr. 15, 2003

(54) STEM CAP FOR AIR CONDITIONING SERVICE VALVE

(75) Inventors: Michael G. Martin, Van Wert, OH (US); David Klafter, Zanesville, IN (US); Todd Markward, Van Wert, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/431,828

(22) Filed: Nov. 2, 1999

(51) Int. Cl.[7] .................. F16K 31/50; F16K 51/00; F25B 45/00; F25B 49/00
(52) U.S. Cl. ............... 137/315.27; 62/77; 62/292; 62/298; 62/299; 137/15.18; 137/315.4
(58) Field of Search ................ 62/77, 292, 298, 62/299; 137/15.17, 15.18, 315.27, 315.4; 251/215, 216, 223, 225, 330

(56) References Cited

U.S. PATENT DOCUMENTS

| | | | |
|---|---|---|---|
| 3,901,268 A | 8/1975 | Mullins | 137/318 |
| 3,916,947 A | * 11/1975 | Holmes et al. | 137/544 |
| 3,978,881 A | * 9/1976 | Mouranie | 137/318 |
| 4,018,246 A | 4/1977 | Langstroth | 137/318 |
| 4,026,320 A | * 5/1977 | Grahl | 137/343 |
| 4,644,973 A | * 2/1987 | Itoh et al. | 137/883 |
| 5,172,557 A | * 12/1992 | Hubbell, Jr. | 62/77 |
| 5,396,774 A | * 3/1995 | Hubbell, Jr. | 62/77 |
| 5,957,147 A | * 9/1999 | Hubbell, Jr. | 62/292 |

* cited by examiner

Primary Examiner—George L. Walton
(74) Attorney, Agent, or Firm—Joseph J. Pophal

(57) ABSTRACT

A service valve and cap assembly is disclosed. The service valve comprises a valve stem that is inserted into a valve body. An upper portion of the valve body defines a collar selectively formable between a first installation inner diameter to a second retention inner diameter. A service valve sealing cap includes a base portion and a generally annular sealing portion. An annular shoulder is formed on the sealing portion inner diameter, such that the radially inner diameter of the shoulder portion is less than the collar first outer diameter, and is greater than the collar second outer diameter.

14 Claims, 2 Drawing Sheets

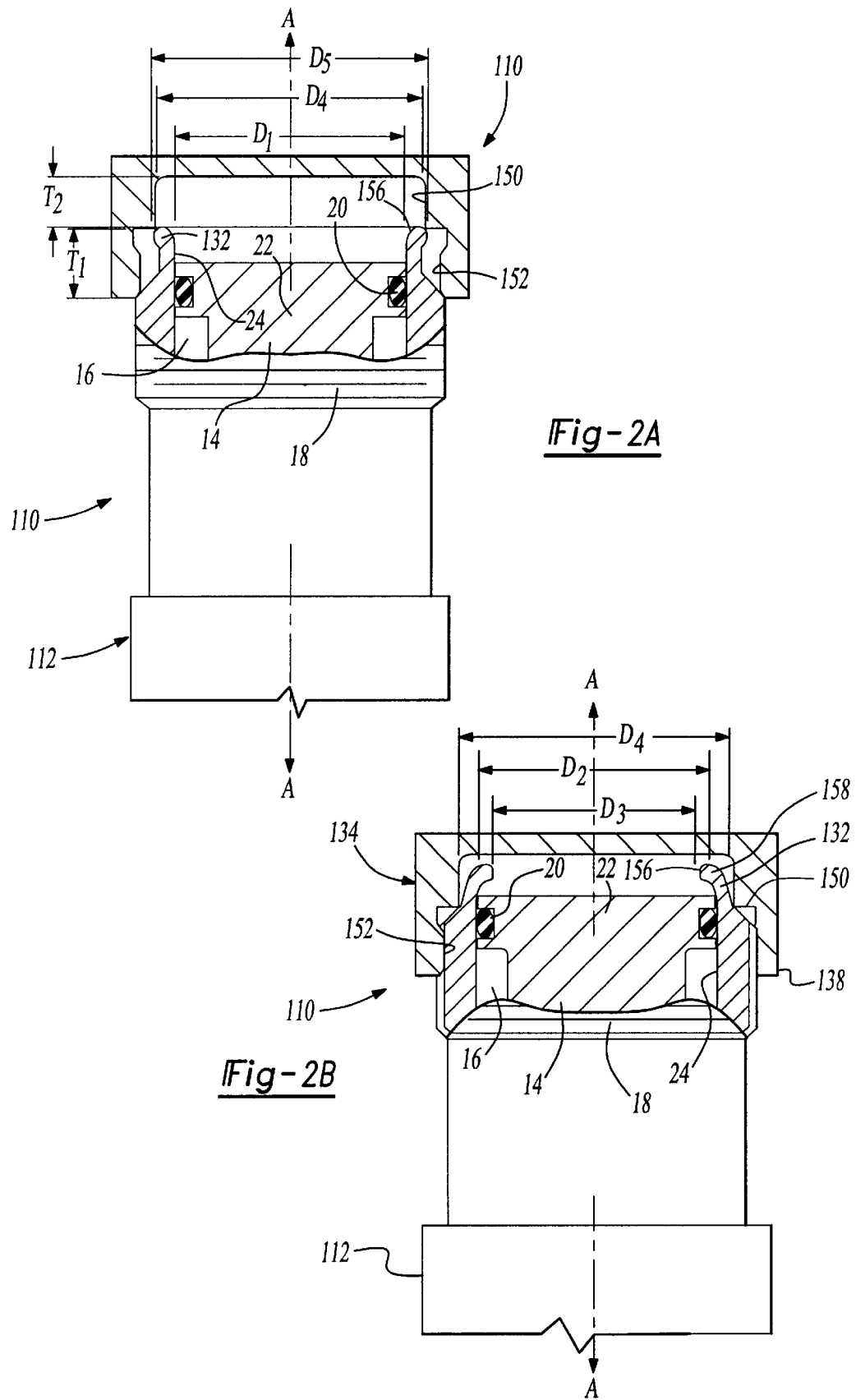

STEM CAP FOR AIR CONDITIONING SERVICE VALVE

FIELD OF THE INVENTION

The present invention relates to air conditioning service valves and more particularly to service valve and stem cap designs.

BACKGROUND OF THE INVENTION

Residential and commercial air conditioning systems include a service valve for charging and/or bleeding refrigerant contained within the air conditioning system. In these systems, the service valve is typically opened and closed by manually adjusting a valve stem inwardly or outwardly within a valve body cavity. The valve stem is typically housed within and threadably engages the valve body so that when the valve stem is rotated about its longitudinal axis, the valve stem moves inwardly or outwardly depending upon the direction of the rotation. A service valve sealing cap engages the outside of the valve body and encapsulates the valve stem cavity to prevent ingress of harmful debris or moisture.

The refrigerant within air conditioning systems may exert high pressures upon the valve stem and upon the valve body. The internal high pressure of the refrigerant may force the valve stem out of the valve body, leading to both loss of refrigerant and potential loss of the valve stem. In particular, if the service personnel rotates the valve stem sufficiently outwardly so that the threads on the exterior valve stem disengage from the threads on the interior of the valve body cavity, the force on the valve stem due to the high pressure refrigerant may push the valve stem from the valve body. If the valve stem becomes lost or if the refrigerant escapes, then any service operation becomes more complex and potentially more expensive to carry out, especially if the valve stem becomes lost and requires replacement.

Various methods have been developed to prevent escape of the valve stem. For instance, structural valve stem retention features may be built into the valve body to limit the outward movement of the valve stem. However, some of these structural features, such as snap rings, may be removed or disengaged by the service personnel, who may then neglect to replace the structural features, thereby disabling the features designed to retain the valve stem within the valve body. Thus, manufacturers of such service valves desire permanent non-removable retention features that prevent removal or separation of the valve stem from the valve body. Additionally, once a service person replaces the service valve cap, it is impossible to tell if the retention features have been removed.

Likewise, during manufacture, it is often difficult during manufacture to ascertain that each and every service valve produced includes all the structural retention features without performing a costly and time-consuming visual inspection of each part. Thus, manufacturers also desire readily visible indicators that all structural retention features are included and installed on any service valve produced.

SUMMARY OF THE INVENTION

The present invention is directed to a service valve and cap assembly whereby a manufacturer and an installer may readily ascertain that structural valve stem retention features exist that will prevent the separation of a valve stem from a valve body. The service value comprises a valve stem having a first radial outer diameter that is threadably inserted into a valve body cavity having a first inner diameter corresponding to the first outer diameter. An upper portion of the valve body defines a collar selectively formable between an installation position and a retained position, where the installation position inner diameter is substantially equivalent to the first inner diameter, and the retention position inner diameter is less than the first inner diameter. The collar also defines respective first and second collar outer diameters, depending upon the collar position. Lastly, the collar top extends a first distance longitudinally above a first attachment mechanism formed on the exterior surface of the valve body.

The valve body further includes exterior threads to receive a sealing cap to encapsulate the valve stem and the collar. The sealing cap includes a base portion and a sealing portion longitudinally extending from the base portion. The sealing portion inner surface further includes a second attachment mechanism for engagement with the corresponding first attachment mechanism on the exterior of the valve body. The threads are located a longitudinal second distance from the base portion, where the second longitudinal distance is greater than the first longitudinal distance between the collar top and the exterior attachment mechanism. The sealing portion inner surface also includes an annular shoulder formed between the top of the threads and the base portion that defines a shoulder inner diameter. The shoulder inner diameter is less than the first collar outer diameter, and is greater than the second collar outer diameter. During manufacture, after the valve stem is inserted into the cavity, the collar is compressed from the installation position to the retention position. In this way, the valve stem is structurally prevented from becoming separated from the valve body because the retention position inner diameter is less than the outer diameter of the valve stem. The compression of the collar also reduces the collar outer diameter to the second collar outer diameter which is less than the shoulder inner diameter. Lastly, the compression of the collar reduces the longitudinal extent that the collar projects above the first attachment mechanism, thereby allowing first and second attachment mechanisms to interact and lock the cap onto the valve body. Likewise, if the collar is not compressed, then the shoulder inner diameter is smaller than the first collar outer diameter, and the collar height is not reduced, so that the cap and valve body attachment mechanisms will not engage As a result, an uncompressed collar in the installation position interferes with the shoulder portion and the sealing cap base portion, thereby preventing installation of the sealing cap.

As long as the collar is compressed, thereby ensuring positive retention of the valve stem, the sealing cap may be installed. Additionally, if a sealing cap is installed, then the manufacturer may be assured that the compressed collar will prevent separation of the valve stem from the valve body. However, if the collar is not compressed, the sealing cap will not fit over the collar, thereby providing a simple visual verification that the valve stem is not structurally retained within the valve body. The manufacturer and the service personnel are thereby made aware if the valve body does not provide sufficient structural support to prevent loss of refrigerant and separation of the valve stem from the valve body.

BRIEF DESCRIPTION OF DRAWINGS

The features and inventive aspects of the present invention will become more apparent upon reading the following detailed description, claims, and drawings, of which the following is a brief description:

FIG. 2A is a cross-sectional view of a service valve and cap according to the present invention before compression of the collar.

FIG. 2B is a cross-sectional view of the service valve and cap of FIG. 2A after compression of the collar.

DETAILED DESCRIPTION OF PREFERRED EMBODIMENTS

Figure 1:
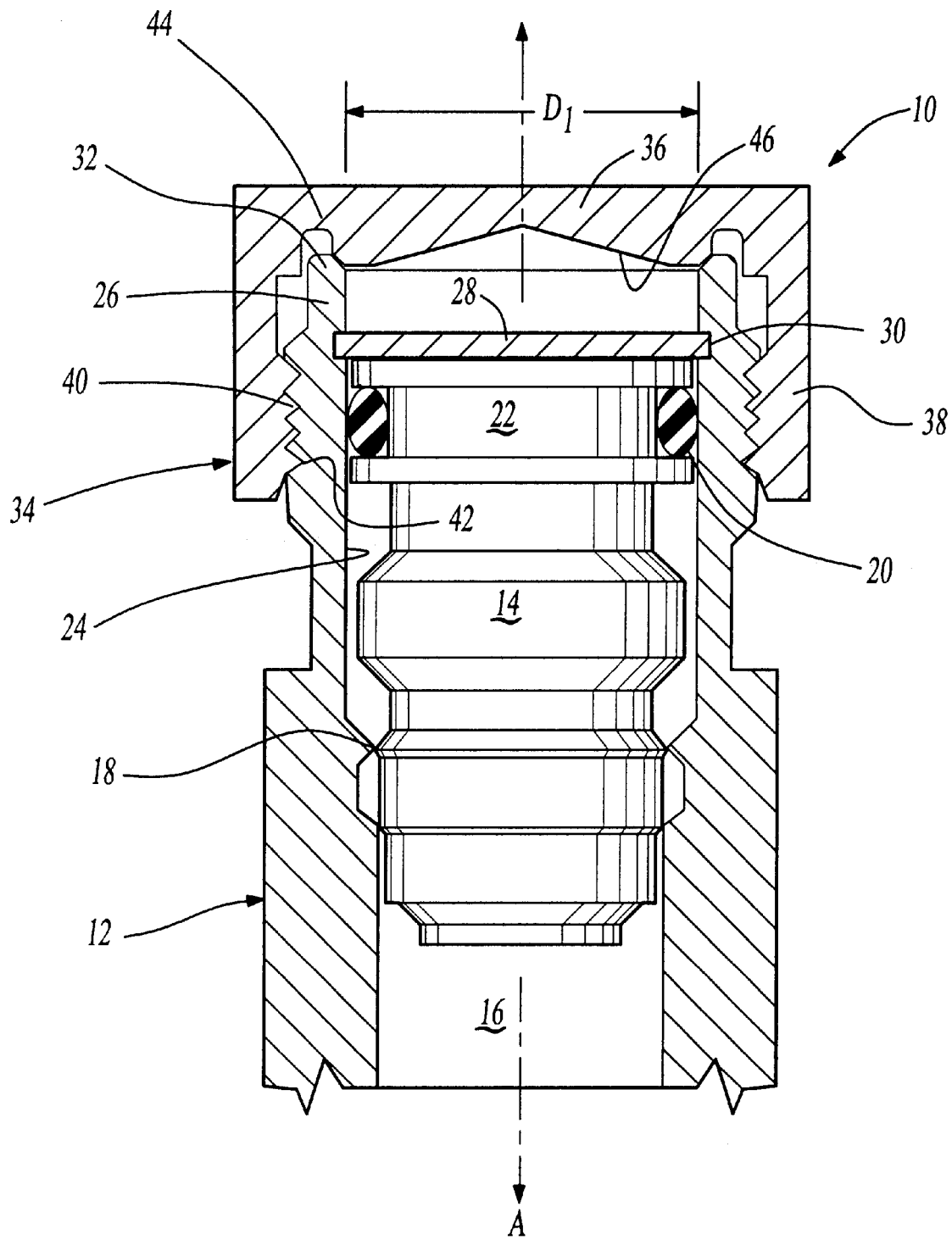
FIG. 1 is a cross-sectional view of a prior art service valve and cap.

Air conditioner service valves 10 and 110 are shown in FIGS. 1, 2A and 2B. In general, the service valves 10 and 110 include a valve body 12 and a valve stem 14. The valve stem 14 is received into a cavity 16 on the valve body 12, and is supported on threads 18. The valve stem 14 is therefore capable of movement along a longitudinal axis A—A as it is rotated inwardly or outwardly, clockwise or counterclockwise, depending upon the direction of threaded engagement between the valve stem 14 and the valve body 12. An o-ring 20 provides a seal between the top portion 22 of the valve stem and the inner surface 24 of the valve body.

The cavity 16 defines at its upper portion 26 an inner diameter $D_1$ that closely corresponds to an outer diameter $D_2$ of the valve stem top portion 22. However, as seen in FIG. 1, the inner diameter of the valve body cavity 16 at the upper portion 26 is generally constant. To prevent the valve stem 14 from moving upwardly along axis A—A to the extent that the threads 18 become disengaged, it is known to provide a snap ring 28 that seats in a groove 30 formed in the inner surface of the valve body upper portion 26. The top 32 of the valve body 12 extends longitudinally above the snap ring 28. A sealing cap 34 is provided to cover the valve stem 14 and the upper portion of the valve body 12, thereby preventing the ingress of potentially harmful debris and moisture. The cap 34 generally includes a base 36 and a longitudinally extending sealing portion 38. The inner diameter of the sealing portion 38 includes threads 40 that engage corresponding threads 42 formed on the valve body 12 exterior. The sealing cap 34 need not be threadably attached to the valve body, but may also be attached using other methods, such as snap fittings and the like. The sealing cap base 36 may also include a recess 44 in a bottom surface 46 that indexes with and receives the top 32 of the valve body 12 to further seal the valve body cavity.

As noted above, when the service valve 10 is properly assembled and includes the sealing cap 34 and the snap ring 28, the valve stem 14 is structurally limited from excessive upward longitudinal movement by the snap ring 28. However, the snap ring 28 is easily removed by service personnel. Moreover, it is possible that during manufacture of the valve 10 that the snap ring 28 may never be actually installed. But once the sealing cap 34 is installed, it is impossible to detect a missing snap ring 28 without removing the cap 28 and performing a visual inspection. Such an inspection is both time consuming and expensive if performed during manufacture, and is undesirable to perform on valves that are installed on pressurized air conditioning systems if the valve does not include the snap ring 28.

The sealing cap 134 of FIGS. 2A and 2B is designed to alleviate the drawbacks of removable snap rings by cooperating with the design of the valve body 112. As described below, it is assumed that the sealing cap 134 surrounds a generally circular portion of the valve body 112. However, the valve body 112 may be formed into other shapes, such as square, rectangular, etc., with a correspondingly shaped cap 134. The general concept of the present invention is meant to encompass such other shapes, notwithstanding the fact that the description may be limited to only generally round sealing caps.

The sealing cap 134 is substantially similar to the cap 34 of FIG. 1, but further includes an annular shoulder 150 on the inner diameter 152 of a sealing cap 134 sealing portion 138. Additionally, as best seen in FIG. 2B, the top 132 of the valve body 112 includes a collar 156 that is compressed radially inwardly into a reduced diameter portion 158 of the valve body 112 after the valve stem 14 is inserted into the valve body 112. The compression of the collar 156 may occur by any conventionally known means, such as stamping, extrusion, hot or cold forming, or the like. The reduced diameter portion has an inner diameter of $D_3$ which is slightly less than the outer diameter $D_3$ of the valve stem top portion 22. The reduced diameter collar 156 therefore structurally prevents the valve stem 14 from escaping out of the valve body 112. Of course, the collar 156 must therefore be formed from a material that is deformable to a retention position while still providing the necessary structural strength to withstand the pressure exerted by the refrigerant against the valve stem 14. Thus, the deformed collar 156 must include sufficient thickness t of the collar material to effectively retain the valve stem 14.

The annular shoulder 150 allows simple verification that the collar 156 has been properly formed. As seen in FIG. 2A, at the time the valve stem 14 is first inserted within the valve body 112, the inner diameter $D_1$ of the valve stem cavity 116 is substantially similar to the outer diameter $D_2$ of the valve stem top portion 22. In this configuration, the collar 156 is formed in an installation position and has not been formed into a reduced diameter collar. In the collar 156 installation position, the valve stem 14 may be readily extracted from within the valve stem cavity 116. However, the sealing cap 134 will not fit over the valve body top 132 unless the sealing collar 156 has been formed into a reduced diameter, because the inner diameter D4 of the annular shoulder 150 is less than the outer diameter $D_5$ of the collar top 132. Any attempt to install the sealing cap 134 over a non-reduced diameter collar 156 will cause the annular shoulder 150 to interfere with the valve body top 132, thereby preventing engagement of the threads 40, 42 between the cap 134 and the valve body 112. Additionally, the collar 156, in the installation position, extends longitudinally a distance t1 above the threads 42 on the valve body 112 when the installation position. The distance t1 is greater than a distance t2 between the underside of the base portion 136 and the bottom of the annular shoulder 150. Thus, the distance t1 is sufficient cause the top 132 of the collar 156 to interfere with the base portion 136 if the sealing cap 134 is placed over the valve stem 14 before the collar 156 is compressed into the retention position, and serves to prevent the threads 40, 42 from engaging between the sealing cap 134 and the valve body 112 when the collar is in the installation position. Unless the collar 156 is compressed to a retention position, the cap 134 will not engage the valve body 112.

However, when the collar 156 is compressed into the retention position, as shown in FIG. 2B, the collar 156 extends longitudinally above the threads 42 a distance less than t2, thereby allowing the threads 40, 42 to engage and the cap 134 to seat over the valve stem 14. Additionally, when the collar 156 is formed into the retention position reduced diameter collar 156, the reduced diameter collar 156 does not interfere with the annular shoulder 150 on the sealing cap 134. Therefore, if the sealing cap 134 fits over the valve body top 132 far enough to engage the threads 40, 42, then the manufacturer is assured that the valve stem 14 is structurally prevented by the reduced diameter collar 156 from being separated from the valve body 112. And if the sealing cap 134 does not fit over the valve assembly 110, then the valve stem 14 is not retained within the valve body 112. As a result, the manufacturer is provided a simple visual verification that the valve stem is not structurally retained within the valve body.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An air conditioner service valve, comprising:
    a valve body, said body defining a valve cavity for receiving a valve stem, said valve body further including a deformable collar formed on a top portion of said valve body and a first attachment mechanism on an exterior portion of said valve body, said collar selectively deformable between an installation and a retention position, said collar extending a first distance longitudinally from said attachment mechanism when said collar is in said installation position; and
    a sealing cap for sealing said valve cavity including a base portion and a sealing portion longitudinally extending from said base portion, an inner surface of said sealing portion including a shoulder having an inner portion and a second attachment mechanism for engaging said first attachment mechanism when said collar is in said retention position, wherein said shoulder inner portion abuts a distal end of said deformable collar in said installation position which prevents said second attachment mechanism from engaging said first attachment mechanism.

2. The air conditioner service valve of claim 1, wherein said second attachment mechanism extends longitudinally from said base portion a second distance wherein said first distance is greater than said second distance.

3. The air conditioner service valve as in claim 2, wherein said first and second attachment mechanisms are threads selectively interfittable with each other.

4. The air conditioner service valve as in claim 3, wherein said cap is removably attachable to said valve body.

5. The air conditioner service valve as in claim 1, wherein said collar in said retention position defines a first thickness sufficient to prevent separation of said valve stem and said valve body.

6. The air conditioning service valve as in claim 1, wherein said first attachment mechanism only engages said second attachment mechanism when said collar is in said retention position.

7. In an air conditioning service valve having a valve stem rotatably retained within a valve body, a top portion of said valve stem visible within the valve body, the valve body further including a first attachment mechanism for removably attaching a valve cap and a deformable collar capable of being deformed alternatively between an installation position to a retention position, wherein the collar in the installation position longitudinally extends a first distance above the first attachment mechanism, wherein the collar in the retention position prevents the separation of the valve stem from the valve body and longitudinally extends a second distance above the first attachment mechanism, said valve cap for readily identifying valves having the collar in the retention position, comprising:
    a radially extending base portion for covering the visible portion of the valve stem; and
    an annular longitudinally extending sealing portion connected to at least a portion of an outer circumference of said base portion, said sealing portion including a shoulder formed on an inner surface of said annular sealing portion adjacent said base portion, and a second attachment mechanism, wherein said shoulder abuts a distal end of said deformable collar in the installation position which prevents said second attachment mechanism from engaging said first attachment mechanism.

8. The air conditioning service valve cap of claim 7, wherein said shoulder longitudinally extends a third distance from said base portion, wherein said third distance is less than said first distance but greater than said second distance.

9. The air conditioning service valve cap of claim 7, wherein said first and second attachment mechanisms include mating threads on said valve body and said sealing portion.

10. The air conditioning service valve as in claim 6, wherein said first attachment mechanism only engages said second attachment mechanism when said collar is in said retention position.

11. A method for verifying the retention of air conditioning service valves, comprising:
    inserting a valve stem into a valve body, said valve body including a deformable collar on an upper portion thereof having an installation position;
    compressing said collar radially inwardly to a retention position; and
    installing a service valve cap over said valve stem and collar, said service valve cap including an annular sealing portion with a shoulder formed on the inner diameter thereof, said shoulder abutting a distal end of said deformable collar in the installation position and having said shoulder surrounding said distal end of said deformable collar in said retention position when said service valve cap is attached to said valve body.

12. The method of claim 11, wherein said collar longitudinally extends a first distance above said inserted valve stem, said first distance greater than the longitudinal extent of said shoulder.

13. The method of claim 11, wherein said collar in said retention position is sufficiently thick to prevent separation of said valve stem from said valve body.

14. The method of claim 11, wherein said cap includes means for attaching said cap to said valve body.

* * * * *